United States Patent
Li et al.

(10) Patent No.: US 12,271,792 B2
(45) Date of Patent: Apr. 8, 2025

(54) SYSTEMS AND METHODS FOR VISION-AND-LANGUAGE REPRESENTATION LEARNING

(71) Applicant: Salesforce, Inc., San Francisco, CA (US)

(72) Inventors: Junnan Li, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 925 days.

(21) Appl. No.: 17/370,524

(22) Filed: Jul. 8, 2021

(65) Prior Publication Data

US 2022/0391755 A1    Dec. 8, 2022

Related U.S. Application Data

(60) Provisional application No. 63/193,286, filed on May 26, 2021.

(51) Int. Cl.

| | |
|---|---|
| G06N 20/00 | (2019.01) |
| G06F 18/214 | (2023.01) |
| G06F 40/20 | (2020.01) |
| G06N 3/02 | (2006.01) |
| G06V 30/148 | (2022.01) |

(52) U.S. Cl.
CPC .......... *G06N 20/00* (2019.01); *G06F 18/214* (2023.01); *G06F 40/20* (2020.01); *G06N 3/02* (2013.01); *G06V 30/153* (2022.01)

(58) Field of Classification Search
CPC ...................................................... G06N 20/00
USPC .................................................................. 706/12
See application file for complete search history.

(56) References Cited

FOREIGN PATENT DOCUMENTS

| CN | 113792113 A | * | 12/2021 | |
| CN | 117501259 A | * | 2/2024 | ............ G06F 40/20 |

OTHER PUBLICATIONS

Yen-Chun Chen et al., UNITER: UNiversal Image-TExt Representation Learning, ECCV, vol. 12375, 2020, 17 pages.
Kaiming He et al., Momentum Contrast for Unsupervised Visual Representation Learning, CVPR 2020, 9729-9738 pages.
International Search Report and Written Opinion for PCT Application PCT/US2022/013889, dated May 13, 2022, 11 pages.

(Continued)

*Primary Examiner* — Ruay Ho
(74) *Attorney, Agent, or Firm* — Haynes and Boone, LLP

(57) ABSTRACT

Embodiments described herein provide visual-and-language (V+L) systems and methods for learning vision and language representations. Specifically, a method may comprise receiving a training dataset comprising a plurality of image samples and a plurality of text samples; encoding the plurality of image samples into a plurality of encoded image samples and the plurality of text samples into a plurality of encoded text samples; computing a first loss objective based on the plurality of encoded image samples and the plurality of encoded text samples; encoding a first subset of the plurality of encoded image samples and a second subset of the plurality of encoded text samples into a plurality of encoded image-text samples; computing a second loss objective based on the plurality of encoded image-text samples; and updating the V+L model based at least in part on the first loss objective and the second loss objective.

17 Claims, 4 Drawing Sheets

(56) References Cited

OTHER PUBLICATIONS

Cheng et al., "Data-Efficient Language-Supervised Zero-Shot Learning with Self-Distillation", Arxiv.Org, Cornell University Library, 201 Olin Library Cornell University Ithaca, NY 14853, Apr. 18, 2021, XP081940352.
Van Den Oord et al., "Representation Learning with Contrastive Predictive Coding", Jan. 22, 2019, Retrieved from the Internet: URL:https://arxiv.org/pdf/1807.03748.pdf [retrieved on May 4, 2022], XP055917966.
Wang et al., "Self-supervised Image-text Pre-training With Mixed Data in Chest X-rays", Arxiv.Org, Cornell University Library, 201 Olin Library Cornell University Ithaca, NY 14853, Mar. 30, 2021 XP081919343.

* cited by examiner

SYSTEMS AND METHODS FOR VISION-AND-LANGUAGE REPRESENTATION LEARNING

RELATED APPLICATIONS

This application claims priority to U.S. Provisional Patent Application No. 63/193,286, filed May 26, 2021, which is entirely incorporated herein by reference for all purposes.

TECHNICAL FIELD

The present disclosure relates generally to machine learning models and neural networks, and more specifically, to vision and language representation learning.

BACKGROUND

Vison-and-learning pretraining (VLP) aims to learn multimodal representations from large-scale image-text pairs that can improve downstream vision-and-language (V+L) tasks such as predicting image-text retrieval, image-text relationship, visual question answering, or natural language for visual reasoning. While VLP approaches have made some progress on vision-and-language tasks, the prior VLP framework may suffer from several limitations, including poor modeling efficiency, high annotation and/or computation overheads, and/or overfitting to noise.

Therefore, there is a need for improved VLP systems and methods that avoid the disadvantages associated with prior VLP methods.

Figure 1:
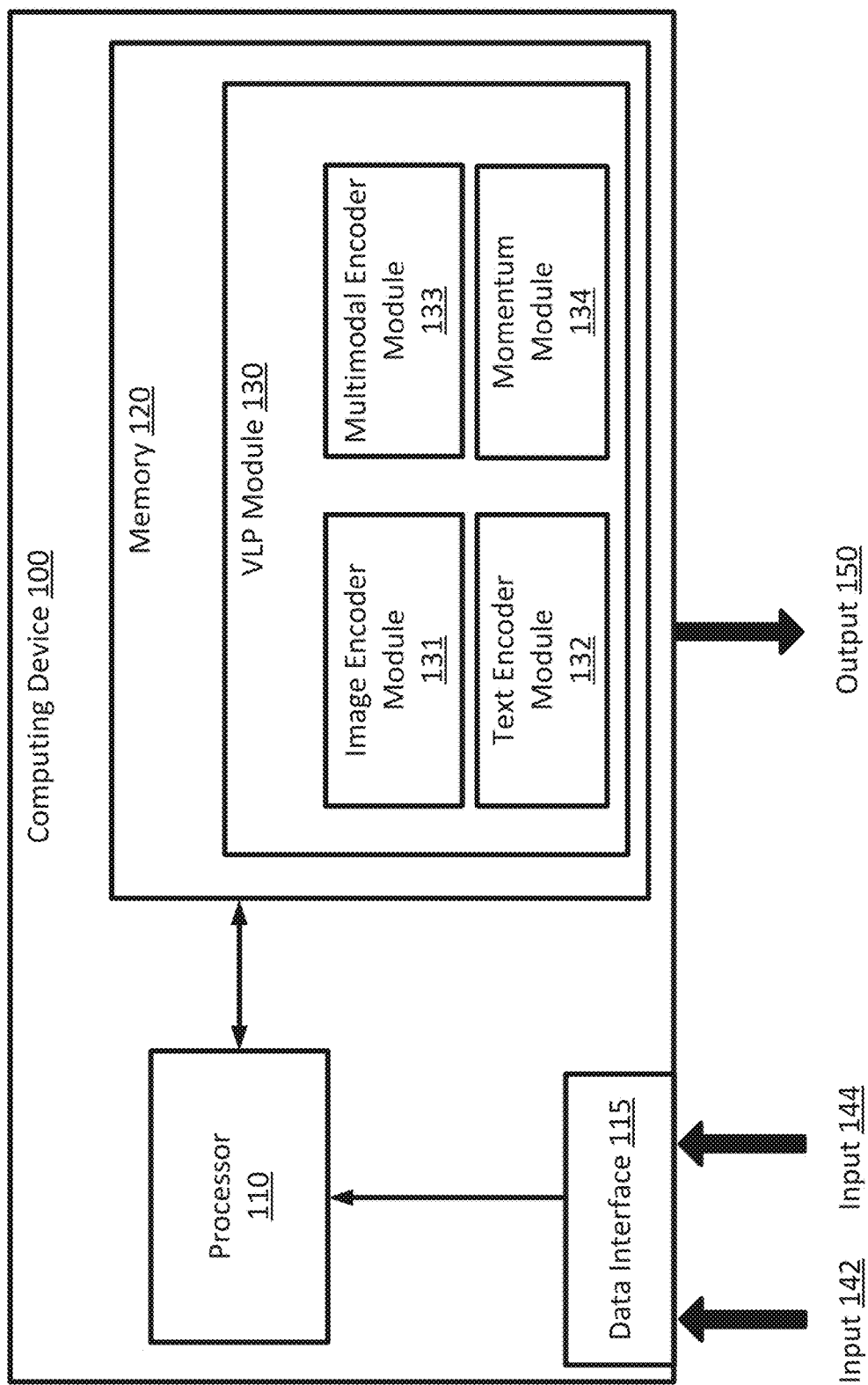
FIG. 1 is a simplified diagram of a computing device for implementing a vision-and-language pretraining (VLP) method, according to embodiments described herein.

In the figures, elements having the same designations have the same or similar functions.

DETAILED DESCRIPTION

Machine learning methods have been applied to vision-and-language (V+L) tasks. Such machine learning methods often use vision-and-language pretraining (VLP), which aims to learn multimodal representations from large-scale image-text pairs. This prior VLP framework may suffer from several limitations. First, image features and word token embeddings reside in very different spaces, which may make it difficult for multimodal encoders to learn to model the interactions between the features and embeddings. Second, the prior VLP framework requires bounding box annotations for pretraining and/or high-resolution images, resulting in high annotation and/or computation overheads. Third, the image-text datasets used to train the prior VLP methods may be noisy, resulting in overfitting to the noise and a concomitant reduction in performance.

In view of the need for improved VLP systems and methods that avoid the disadvantages associated with prior VLP methods, embodiments described herein provide VLP systems and methods, such as methods for pretraining a V+L model that utilize an intermediate image-text contrastive (ITC) loss. For example, trainings input are fed to the unimodal image and text encoders to be transformed to unimodal outputs, and the ITC loss is computed by calculating a loss between a predicted similarity of the unimodal outputs from image-text pairs and a ground-truth similarity. The ITC loss is computed based at least in part on the representations output by the unimodal image and text encoders, which can be in turn updated based at least in part on the ITC loss. In this way, the image features and the text features may be aligned through the training process based on the ITC loss, making it easier for the multimodal encoder to perform cross-modal learning. In addition, the unimodal encoders' ability to understand the semantic meaning of images and texts may be improved through training based on the ITC loss. The common embedding space for images and texts may also be learnt based on the ITC loss, enabling the image-text matching objective to find more informative samples.

In one embodiment, VLP systems and methods described herein employ momentum distillation (MoD) to generate pseudo targets to capture visual concepts that may not be described by the ground-truth text. MoD utilizes a momentum model to generate pseudo-targets as additional supervision during training and to feed these pseudo-targets to train image encoders, text encoders, and multimodal encoders, allowing improved learning under noisy supervision and the use of larger uncured training datasets.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

VLP Systems and Methods

FIG. 1 is a simplified diagram of a computing device for implementing a VLP system for training a vision-and-learning (V+L) model, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a VLP module 130 that may be used to implement and/or emulate the systems and models, and/or to implement any of the methods described further herein. In some examples, the VLP module 130, may receive several inputs, e.g., such as an image input 142 and a text input 144 from a user, via a data interface 115. The data interface 115 may be any of a user interface that receives an image input and text input from a user, or a communication interface that may receive or retrieve an image input and text input from a database. The VLP module 130 may generate an output 150 such as one or more output image-text pairs.

In some embodiments, the VLP module 130 includes an image encoder module 131 and a text encoder module 132. Specifically, the image encoder module is configured to form an encoding of the image input 142. The text encoder module is configured to form an encoding of the text input 144. In some embodiments, the VLP module 130 includes a multimodal encoder 133. The multimodal encoder is configured to receive the encoding of the image input and the encoding of the text input. The multimodal encoder is configured to fuse the encoding of the image input with the encoding of the text input. In some embodiments, the VLP module 130 includes a momentum module 134. During training, the momentum module is configured to receive output from the multimodal encoder and to perform momentum distillation (MoD) that generate pseudo targets of the outputs such as exponential-moving average versions of the outputs.

Some examples of computing devices, such as computing device 100 may include non-transitory, tangible, machine readable media that include executable code. Some common forms of machine readable media are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
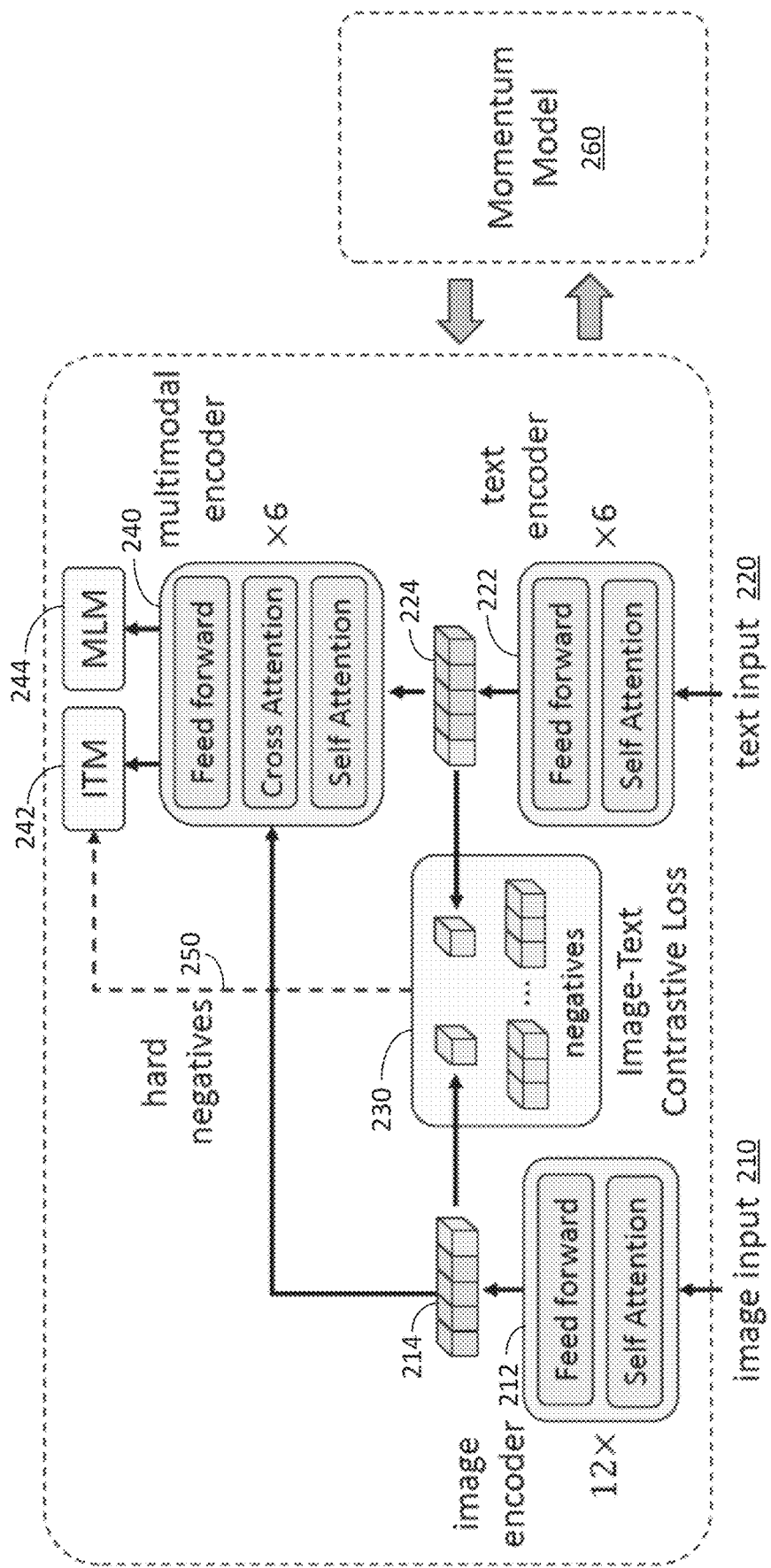
FIG. 2 is a simplified diagram of a process flow for training a VLP system, according to embodiments described herein.

FIG. 2 is a simplified diagram of a process flow for training a V+L model using one or more loss objectives, according to some embodiments. As shown in FIG. 2, an image input 210 is passed to a feed forward image encoder 212 to generate embeddings 214. An input image I is encoded into a sequence of embeddings 214 such as $\{v_{cls}, v_1, \ldots v_N\}$, where $v_{cls}$ is the embedding of the [CLS] token. A text input 220 is passed to a feed forward text encoder 222 to generate embeddings 224. For example, the text encoder transforms an input text T into a sequence of embeddings 224 such as $\{w_{cls}, w_1, \ldots w_N\}$.

The V+L model 200 can comprise an image encoder 212, a text encoder 222, and a multimodal encoder 240. An image-text contrastive loss 230 can be generated to align the unimodal representations of an image-text pair before fusion at the multimodal encoder 240. An image-text matching loss 242 (using hard negatives 250 mined through contrastive similarity) and a masked-language-modeling loss 244 are applied to learn multimodal interactions between image and text. In order to improve learning with noisy data, pseudo-targets can be generated using the momentum model 260 (e.g., a moving-average version of the base model) as additional supervision during training of the V+L model 200.

The image encoder 212 and the text encoder 222 can include one or more feed forward layers and one or more self-attention layers. The multimodal encoder 240 can include one or more feed forward layers, one or more cross-attention layers, and one or more self-attention layers. For example, a 12-layer transformer can be used for the image encoder 212 and a 6-layer transformer can be used for both the text encoder 222 and the multimodal encoder 240. The text encoder 222 is initialized using the first 6 layers of the BERT model, and the multimodal encoder is initialized using the last 6 layers of the BERT model. The image features can be fused with the text features through cross attention at each layer of the multimodal encoder 240.

Encodings 214 from the image encoder 212 and encodings 224 from the text encoder 222 are used to generate a first loss objective comprising an image-text contrastive learning (ITC) loss function 230 so the encodings 214 from the image encoder 212 and encodings 224 from the text encoder 222 can be aligned and compared. The image-text contrastive learning (ITC) aims to learn better unimodal representation before fusion of encodings 214 from the image encoder 212 and encodings 224 from the text encoder 222.

For generating the image-text contrastive learning (ITC) loss of each image and text, a similarity between each image and each text in a plurality of image-text pairs and nonpaired images and texts can be generated. For example, an image-to-text and a text-to-image similarity of each image and each text can be calculated by using a similarity function $s=g_v(c_{cls})^T g_w(w_{cls})$, such that paired image-text have higher similarity scores. $g_v$ and $g_w$ are linear transformations that map the [CLS] embeddings of the encodings 214 from the image encoder 212 and the [CLS] embeddings of the encodings 224 from the text encoder 222 to normalized lower-dimensional (256-$d$) representations.

The image-text contrastive learning (ITC) loss can further incorporate the most recent M image-text representations of the encoded image samples and the encoded text samples from momentum unimodal encoders 260 in two queues. The normalized features of the encodings 214 and encodings 224 from the momentum unimodal encoders 260 are denoted as $g'_v(v'_{cls})$ and $g'_w(w'_{cls})$. An image-text similarity can be calculated using $s(I, T)=g_v(v_{cls})^T g'_w(w'_{cls})$. A text-image similarity can be calculated using $s(T, I)=g_w(w_{cls})^T g'_v(v'_{cls})$. In a particular aspect, image-to-text similarity and text-to-image similarity can be normalized by softmax as:

$$p_m^{i2t}(I) = \frac{\exp(s(I, T_m)/\tau)}{\sum_{m=1}^{M} \exp(s(I, T_m)/\tau)}, p_m^{t2i}(T) = \frac{\exp(s(T, I_m)/\tau)}{\sum_{m=1}^{M} \exp(s(T, I_m)/\tau)} \quad (1)$$

where $\tau$ is a learnable temperature parameter.

The ground-truth one-hot similarity can be denoted as $y_m^{i2t}(I)$ and $y_m^{t2i}(T)$, where negative pairs have a probability of 0 and the positive pair have a probability of 1.

The image-text contrastive learning (ITC) loss function is computed as an average expected sum of the cross-entropy between the computed softmax-normalized image-to-text similarity and the labeled ground-truth image-to-text similarity and the cross-entropy between the computed softmax-normalized text-to-image similarity and the labeled ground-truth text-to-image similarity.

For example, the image-text contrastive (ITC) learning loss can be defined as the cross-entropy H between a predicted similarity p between an encoded image sample and an encoded text sample and a ground-truth one-hot similarity y, such as:

$$\mathcal{L}_{itc} = \frac{1}{2}\mathbb{E}_{(I,T)\sim D}\left[H\left(p^{i2t}(I), y^{i2t}(I)\right) + H\left(p^{t2i}(T), y^{t2i}(T)\right)\right] \quad (2)$$

In one embodiment, encodings from the image encoder 212 and the text encoder 222 are further passed to a feed forward multimodal encoder 240 to generate encoded image-text samples. The multimodal encoder 240 is configured to generate a second loss objective comprising an image-text matching (ITM) loss 242 and a masked-language-modeling (MLM) loss 244. The ITM loss 242 is computed based on the expected cross-entropy between a predicted image-text matching of the encoded image-text samples and a corresponding ground-truth image-text matching of the encoded image-text samples. The ITM loss 242 can be generated using hard negatives 250 mined through contrastive similarity of the encoded image-text samples.

Image-text matching (ITM) 242 predicts a two-class possibility of the encoded image-text samples, e.g., whether a pair of image and text in the encoded image-text samples is positive (matched) or negative (not matched). The multimodal encoder 240's output embedding of the [CLS] token can be used as the joint representation of a pair of image and text in the encoded image-text samples, and a fully-connected (FC) layer can be appended and then followed by a softmax function to predict a two-class probability $p^{itm}$ of the image-text pair (i.e., whether the image-text pair is positive or negative). The ITM loss can be the cross-entropy H between the predicted two-class probability of the image-text pair and the ground-truth one-hot two-class possibility, such as:

$$\mathcal{L}_{itm} = \mathbb{E}_{(I,T)\sim D} H(p^{itm}(I,T), y^{itm}) \quad (4)$$

where $y^{itm}$ is a 2-dimensional one-hot vector representing the ground-truth label.

The multimodal encoder 240 is also configured to generate a masked-language-modeling (MLM) loss 244 to learn multimodal interactions between the image input 210 and the text input 220. The MLM loss 244 can be defined as a loss function between a predicted possibility of one or more masked tokens in the encoded image-text samples and a ground truth identity of the one or more masked tokens of the encoded image-text samples.

Masked language modeling (MLM) utilizes both the image and the contextual text from the encoded image-text samples to predict the masked words in the encoded image-text samples. The input tokens can be randomly masked out with a predetermined probability such as 15% and replaced with the special token [MASK]. For example, the replacements are 10% random tokens, 10% unchanged, and 80% [MASK].

The MLM learning loss 244 can be the cross-entropy H between the predicted probability for a masked token in the encoded image-text samples and the ground-truth one-hot vocabulary distribution, such as:

$$\mathcal{L}_{mlm} = \mathbb{E}_{(I,\hat{T})\sim D} H(p^{msk}(I,\hat{T}), y^{msk}) \quad (3)$$

where $\hat{T}$ can be used to denote a masked text, $p^{msk}(I, \hat{T})$ can be used to denote the model's predicted probability for a masked token, and $y^{msk}$ is a one-hot vocabulary distribution where the ground-truth token has a probability of 1.

The subset of the encoded image and text samples can be selected based at least in part on negative mining before being encoded into encoded image-text samples by a multimodal encoder. Hard negatives can be sampled for the ITM task with zero computation overhead. A negative image-text pair is hard if they share similar semantics and differ in fine-grained details. The contrastive similarity from eqn (1) can be used to find hard negatives. For each image in a mini-batch, one negative text can be sampled from the same batch following the contrastive similarity distribution, where texts that are more similar to the image have a higher chance to be sampled. Likewise, one hard negative image can be sampled for each text.

In some embodiments, the vision-and-language learning (V+L) model will be updated based at least in part on the first loss objective and the second objective, for example, a combination of the first loss objective and the second loss objective, such as a combination of the ITC loss, the MLM loss, and the ITM loss expressed as:

$$\mathcal{L} = \mathcal{L}_{itc} + \mathcal{L}_{mlm} + \mathcal{L}_{itm} \quad (5)$$

In one embodiment, the final loss objective may be a weighted sum of the ITC loss, the MLM loss, and the ITM loss, with weighting coefficients configured empirically or pre-defined.

In one embodiment, in order to improve learning, such as in the presence of noisy input data for training the model, pseudo-targets are generated using momentum distillation (MoD) as an alternative of original noisy data for training the model. For all of the encoders (e.g., the image encoder 212, the text encoder 222, and the multimodal encoder 240), pseudo-targets are generated by a momentum model 260. The momentum model is a continuously-evolving teacher model which includes exponential-moving average versions of all of the encoders, including the unimodal and multimodal encoders.

During training, the visual-and-language base model can be trained so that its predictions match the predictions from the momentum model. Specifically, for modifying the ITC, an image-text similarity can be adjusted with the pseudo-targets generated by the momentum model, such as $s'(I, T) = g'_v(v'_{cls})^T g'_w(w'_{cls})$; similarity, a text-image similarity can be adjusted with the pseudo-targets generated by the momentum model, such as $s'(T, I) = g'_w(w'_{cls})^T g'_v(v'_{cls})$. Soft pseudo-targets $q^{i2t}$ and $q^{t2i}$ can be generated by replacing s with s' in eqn(1). The ITC can be modified by the MoD pseudo-targets to generate the ITC-MoD loss, such as being defined as:

$$\mathcal{L}_{itc}^{mod} = (1-\alpha)\mathcal{L}_{itc} + \frac{\alpha}{2}\mathbb{E}_{(I,T)\sim D}\left[KL\left(p^{i2t}(I), q^{i2t}(I)\right) + KL\left(p^{t2i}(T), q^{t2i}(T)\right)\right] \quad (6)$$

Similarly, for modifying the MLM, the momentum model's prediction probability for the masked token can be generated, such as by $q^{msk}(I, \hat{T})$. The MLM can be modified by the MoD pseudo-targets to generate the MLM-MoD loss, such as being defined as:

$$\mathcal{L}_{mim}^{mod}=(1-\alpha)\mathcal{L}_{mim}+\alpha\mathbb{E}_{(I,\hat{T})\sim D}KL(p^{msk}(I,\hat{T}),q^{msk}(I,\hat{T})) \qquad (7)$$

In some embodiments, the vision-and-language learning (V+L) model will be updated at least in part on the first loss objective and the second objective, for example, a combination of the first loss objective and the second loss objective that are modified by pseudo-targets generated by a momentum model.

Figure 3:
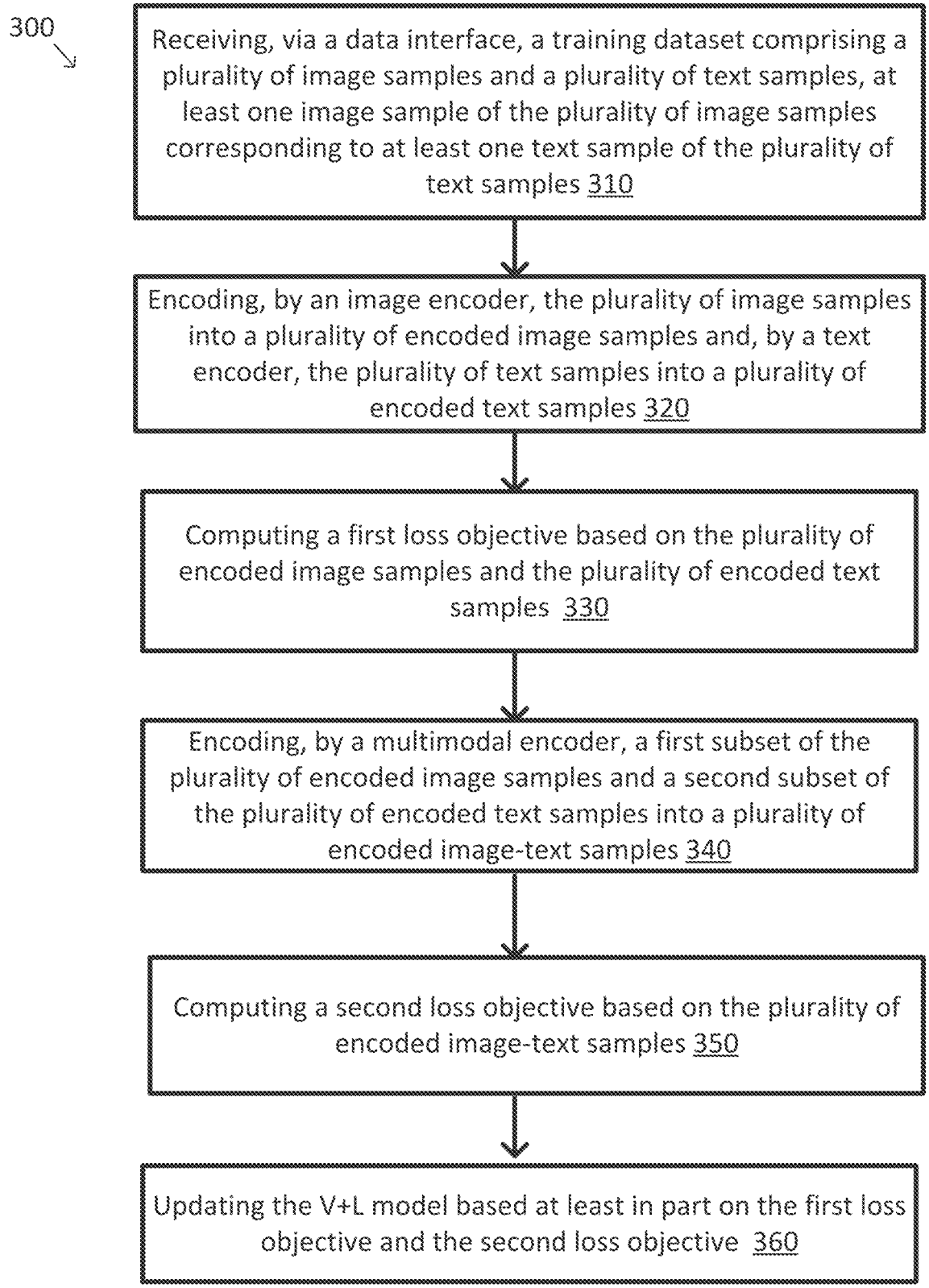
FIG. 3 is a simplified logic flow diagram illustrating an example method that implements the submodules in FIG. 1, according to some embodiments.

FIG. 3 is a simplified logic flow diagram illustrating a method 300 for vision and language representation learning that implements the submodules 131-134 in FIG. 1, according to some embodiments. One or more of the processes 310-360 of method 300 may be implemented, at least in part, in the form of executable code stored on non-transitory, tangible, machine-readable media that when run by one or more processors may cause the one or more processors to perform one or more of the processes 310-360. In some embodiments, method 300 may correspond to the method used by the module 130.

At process 310, a training dataset comprising a plurality of image samples and a plurality of text samples may be received, e.g., via the data interface 115 in FIG. 1. In some embodiments, at least one image sample of the plurality of image samples corresponding to at least one text sample of the plurality of text samples;

At process 320, an image encoder may encode the plurality of image samples into a plurality of encoded image samples. At process 320, a text encoder may encode the plurality of text samples into a plurality of encoded text samples. The encoding of the image encoder or the text encoder may occur at the same time or at different times. For example, the encoding of the image encoder may occur before the encoding of the text encoder. For another example, the encoding of the image encoder may occur after the encoding of the text encoder. In some embodiments, the image encoder is a transformer. In further embodiments, the text encoder is a transformer.

At process 330, a first loss objective may be computed based on the plurality of encoded image samples and the plurality of encoded text samples. The first loss objective may comprise an image-text contrastive loss (ITC) loss objective that refers to a loss function between a predicted similarity between an encoded image sample and an encoded text sample and a corresponding ground-truth similarity.

In additional and alternative embodiments, the method 300 or the process 330 may further comprise forming a momentum model using momentum distillation (MoD); generating a plurality of modeled image samples and a plurality of modeled text samples using the momentum model; including the plurality of modeled image samples in the plurality of image samples; and including the plurality of modeled text samples in the plurality of text samples, and using the modeled image samples and modeled image samples to generate the first objective such as the ITC loss objective.

At process 340, a multimodal encoder may encode a first subset of the plurality of encoded image samples and a second subset of the plurality of encoded text samples into a plurality of encoded image-text samples. In some embodiments, the multimodal encoder is a transformer. The first subset and the second subset may be chosen based at least in part on negative mining or mining negative image-text pairs that share similar semantics but differ in fine-grained details. The negative image-text pairs can be chose at least based on the contrastive similarity distribution from eqn (1).

At process 350, a second loss objective may be computed based on the plurality of encoded image-text samples and includes an image-text matching (ITM) loss objective and a masked language modeling (MLM) loss objective. The ITM loss can be a loss function between a predicted image-text matching of the encoded image-text samples and a corresponding ground-truth image-text matching of the encoded image-text samples. The MLM loss can be a loss function between a predicted for a masked token in the encoded image-text samples and a ground-truth vocabulary distribution of the encoded image-text samples.

In additional and alternative embodiments, the method 300 or the process 350 may further comprise using the modeled image samples and modeled image samples from the momentum model to generate the second objective such as the MLM loss objective.

At process 360, the V+L model may be updated based at least in part on the first loss objective and the second loss objective. For example, updating the V+L model comprises updating the image encoder, the text encoder, and the multimodal encoder based on a combination of the first and second loss objective. For another example, updating the V+L model comprises: updating the image encoder and the text encoder based at least in part on the first loss objective; and updating the multimodal encoder based at least in part on the second loss objective.

In further embodiments, the method 300 may further comprise fine-tuning the V+L model for a task selected from the group consisting of: an image-text retrieval task, an image-to-text retrieval (TR) task, a text-to-image retrieval (IR) task, a visual entailment (VE) task, a visual question answering (VQA) task, and a natural language for visual reasoning for real (NLVR) task.

In one embodiment, a lower bound on the mutual information (MI) between different "views" of an image-text pair can be maximized.

Formally speaking, given two random variables a and b, mutual information (MI) measures their dependency and is defined as $$MI(a,b)=H(a)-H(a|b)=H(b)-H(b|a) \qquad (8)$$

Self-supervised learning methods have been proposed to maximize a lower bound of mutual information, known as InfoNCE:

$$MI(a,b) \geq \mathbb{E}_{p(a,b)}\left[\frac{\exp s(a,b)}{\sum_{\hat{b}\in\hat{B}}\exp s(a,\hat{b})}\right]+\log|\hat{B}| \qquad (9)$$

where $s(a, b)$ is a scoring function (e. g. a dot product between two representations), and $\hat{B}$ contains the positive sample b and $|\hat{B}|-1$ negative samples drawn from a proposal distribution. An alternative version of the ITC loss with one-hot labels (a variation of eqn(2)) can be:

$$\mathcal{L}_{itc}=-\frac{1}{2}\mathbb{E}_{p(I,T)}\left[\frac{\exp(s(I,T)/\tau)}{\sum_{m=1}^{M}\exp(s(I,T_m)/\tau)}+\frac{\exp(s(T,I)/\tau)}{\sum_{m=1}^{M}\exp(s(T,I_m)/\tau)}\right] \qquad (10)$$

Minimizing $\mathcal{L}_{itc}$ can be seen as maximizing a symmetric version of InfoNCE. Hence, ITC considers the two modalities (i.e. I and T) as different views of an image-text pair, and trains the unimodal encoders to maximize the MI between the image and the text for each positive pair.

MLM can be interpreted as maximizing the MI between a masked word token and its masked context (i.e. image+ masked text). Specifically, an alternative version of the MLM loss with one-hot labels (a variation of eqn(3)) can be:

$$\mathcal{L}_{mlm} = -\mathbb{E}_{p(I,\hat{T})}\left[\frac{\exp(\psi(y^{msk})^\top f(I, \hat{T}))}{\sum_{y\in\mathcal{V}} \exp(\psi(y)^\top f(I, \hat{T}))}\right] \quad (11)$$

where $\psi(y): \mathcal{V} \to \mathbb{R}_d$ is a lookup function that maps a word token y into a vector and $\mathcal{V}$ is the full vocabulary set, and $f(I, \hat{T})$ is a function that returns the final hidden state of the multimodal encoder corresponding to the masked token. Hence, MLM considers the two views of an image-text pair to be: (1) a randomly selected word token, (2) the image+the contextual text with that word masked.

Both ITC and MLM generate views by taking partial information from an image-text pair. Momentum distillation can improve upon the ITC and MLM and generate different views from the entire proposed distribution. For ITC, alternative views of an image-text pair can be generated by finding semantically similar images and texts in the training dataset. For MLM, alternative views for the masked word can be generated from the entire vocabulary set. Therefore, MoD can be considered as performing data augmentation to the original views. MoD generates a diverse set of views that are absent in the original image-text pairs, which can improve the model's generalization performance.

Example System Architecture and Performance

Exemplary experiments were conducted to evaluate performance of the VLP system (e.g., the pretrained vision-and-learning model or the V+L model) in downstream tasks. In some embodiments, the pretrained V+L model can be finetuned and applied to one or more downstream tasks, including image-text retrieval, visual entailment, visual question answering, and natural language for visual reasoning for real.

The V+L model consists of a BERT with 123.7 M parameters and a ViT-B/16 with 85.8 M parameters. The model was pretrained for 30 epochs using a batch size of 512 on 8 NVIDIA A100 GPUs. The AdamW optimizer was used with a weight decay of 0.02. Further details of the AdamW optimizer is provided in Loshchilov, Decoupled Weight Decay Regularization, arXiv preprint arXiv:1711.05101, 2017, which is hereby expressly incorporated by reference in its entirety. The learning rate is warmed-up to $1e^{-4}$ in the first 1000 iterations, and decayed to $1e^{-5}$ following a cosine schedule.

For example, the pretraining data was generated using two web datasets (Conceptual Captions and SBU Captions) and two in-domain datasets (COCO and Visual Genome). The total number of unique images is 4.0 M, and the number of image-text pairs is 5.1 M. To show that the V+L model is scalable with larger-scale web data, the much noisier Conceptual 12 M dataset can be also included, increasing the total number of images to 14.1 $M^2$.

During pretraining, random image crops of resolution 256×256 were taken as input, and RandAugment was also applied. Further details of RandAugment is provided in Cubuk et al., RandAugment: Practical automated data augmentation with a reduced search space, CVPR Workshops, pages 702-03, 2020, which is hereby expressly incorporated by reference in its entirety. Color changes were removed from RandAugment because the text often contain color information.

During fine-tuning, the image resolution was increased to 384×384 and the positional encoding of image patches was interpolated. The momentum parameter for updating the momentum model is set as 0.995, and the size of the queue used for image-text contrastive learning is set as 65536. The distillation weight a was linearly ramped-up within the 1st epoch.

Image-text retrieval contains two subtasks: image-to-text retrieval (TR) and text-to-image retrieval (IR). The V+L model was evaluated on the Flickr30K and COCO benchmarks after being fine-tuned using the training samples from each Flickr30K and COCO dataset. For zero-shot retrieval on Flickr30K, the V+L model fine-tuned on COCO was evaluated.

During fine-tuning, the ITC loss (eqn(2)) and the ITM loss (eqn(4)) were jointly optimized. ITC learns an image-text scoring function based on similarity of unimodal features, whereas ITM models the fine-grained interaction between image and text to predict a matching score. Since the downstream datasets contain multiple texts for each image, the ground-truth label of ITC was changed to consider multiple positives in the queue, where each positive has a ground-truth probability of 1/# positives.

During inference, the feature similarity score $s_{itc}$ was first computed for all image-text pairs. The top-k candidates were then selected and used to calculate their ITM score $s_{itm}$ for ranking. The inference speed of the V+L model is much faster than methods that require computing the ITM score for all image-text pairs.

Visual entailment (SNLI-VE) is a fine-grained visual reasoning task to predict whether the relationship between an image and a text is entailment, neutral, or contradictory. Visual entailment can be considered as a three-way classification problem. The class probabilities can be predicted using a multi-layer perceptron (MLP) on the multimodal encoder's representation of the [CLS] token.

Visual question answering ("VQA") requires the model to predict an answer given an image and a question. Different from existing works that formulate VQA as a multi-answer classification problem, VQA can be framed as an answer generation problem. Specifically, a 6-layer transformer decoder can be used to generate answers.

Figure 4A:
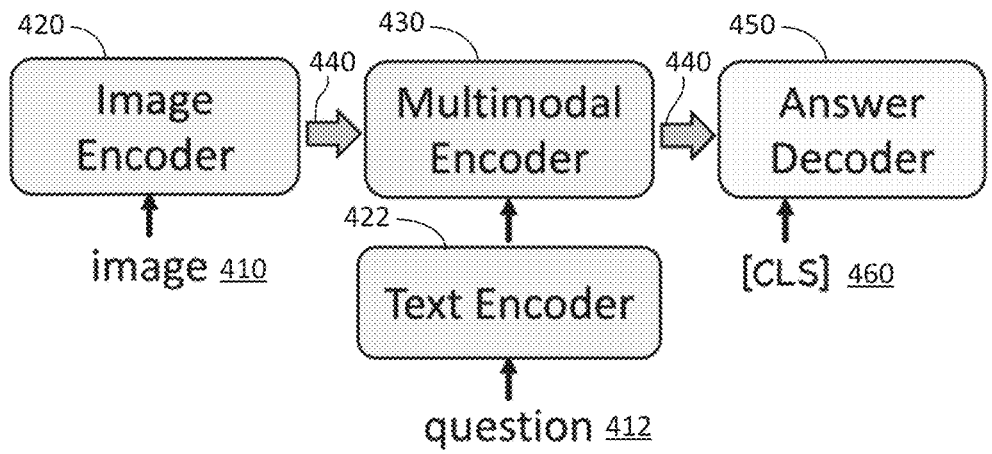
FIGS. 4A-4B are simplified diagrams of a model architecture for using a VLP system in downstream tasks, according to embodiments described herein.
Figure 4B:
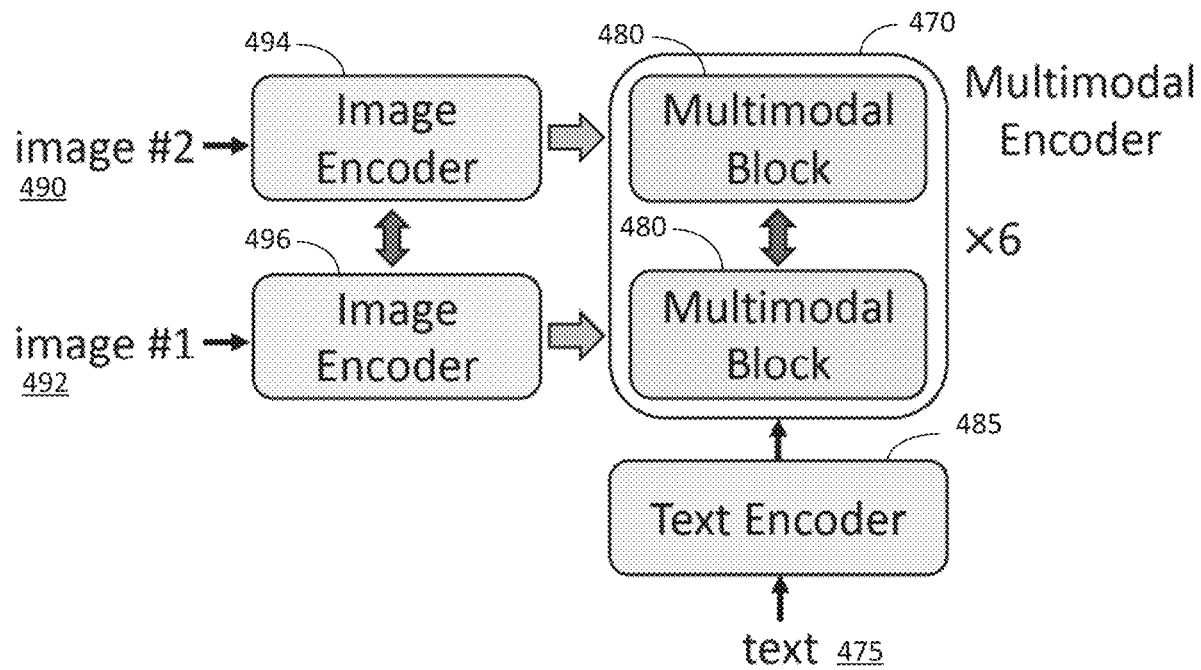

FIGS. 4A-4B are simplified diagrams of a model architecture for using a VLP system in downstream tasks, according to embodiments described herein. As shown in FIG. 4A, a model substantially the same as FIG. 2 is used for visual question answering except an auto-regressive decoder 450 is appended to generate answers given the image-question embeddings. An image encoder 420 encodes an image input 410 into image embeddings and a text encoder 422 encodes a question input 412 into question embeddings. The image embeddings are passed to a multimodal encoder 430 through cross-attention input 440 to generate multimodal image-question embeddings with the question embeddings from the text encoder 422. The auto-regressive answer decoder 450 receives the multimodal image-question embeddings through cross-attention input 440, and a start-of-sequence token ([CLS]) 460 is used as the decoder's initial input token. Likewise, an end-of-sequence token ([SEP]) is appended to the end of decoder outputs, which indicates the completion of generation. The answer decoder 450 is initialized using pretrained weights from the multimodal encoder 430, and finetuned with language-modeling loss. For fair comparison with existing methods, the answer decoder 450 was constrained to only generate from the 3,192 candidate answers during inference.

As shown in FIG. 4B, natural language for visual reasoning for real uses a model to predict whether a text accurately describes a pair of images. A natural extension can be made to a multimodal encoder 470, which enables reasoning over two images 490 and 492. The two images 490 and 492 can feed into two image encoders 494 and 496 that share all parameters to generate embeddings to feed into a multimodal encoder 470. The text input 475 can also feed into a text encoder 485 to generate embeddings that enter the multimodal encoder 470. Each layer of the multimodal encoder 470 is replicated to have two consecutive transformer blocks 480, where each block contains a self-attention layer, a cross-attention layer, and a feed-forward layer (see FIG. 2). The multimodal blocks 480 can also share a cross-attention layer. The two multimodal blocks 480 within each layer are initialized using the same pretrained weights, and the two cross-attention layers share the same linear projection weights for keys and values.

During training, the two multimodal blocks 480 receive two different sets of image embeddings for the image pair 490 and 492. A MLP classifier can be learned on the multimodal encoder's representation of the [CLS] token to predict "true" or "false".

An additional pretraining step can be performed to prepare the new multimodal encoder for image-pair input. A text-assignment (TA) task can be designed as follows: given a pair of images and a text, the model needs to assign the text to either the first image, the second image, or none of them. This can be considered a three-way classification problem, and a FC layer can be used on the [CLS] representations to predict the assignment class. The model was pre-trained with text alignment (TA) for only 1 epoch using the 4M images.

The V+L model was evaluated as shown in Table 1 in downstream tasks (including image-text contrastive learning, contrastive hard negative mining, and momentum distillation). Table 1 shows the performance of the downstream tasks with different variants of the V+L model. Compared to the baseline pretraining tasks (MLM+ITM), adding ITC substantially improved the pretrained model's performance across all tasks. The proposed hard negative mining improved ITM by finding more informative training samples. Furthermore, adding momentum distillation improved learning for both ITC, MLM, and on all downstream tasks (image-to-text retrieval or TR, text-to-image retrieval or IR, visual entailment or VE, visual question answering or VQA, and natural language for visual reasoning for real or NLVR$^2$). The V+L model can effectively leverage more noisy Web data to improve pretraining performance, such as 14 M pretrained images.

TABLE 1

Evaluation of the V + L model on four downstream V + L tasks.

| #Pretrain Images | | TR (flickr test) | IR (test) | VE (test-P) | NLVR$^2$ (test-P) | VQA (test-dev) |
|---|---|---|---|---|---|---|
| 4M | MLM + ITM | 93.96 | 88.55 | 77.06 | 77.51 | 71.40 |
| | ITC + MLM + ITM | 96.55 | 91.69 | 79.15 | 79.88 | 73.29 |
| | ITC + MLM + ITM$_{hard}$ | 97.01 | 92.16 | 79.77 | 80.35 | 73.81 |
| | ITC$_{moD}$ + MLM + ITM$_{hard}$ | 97.33 | 92.43 | 79.99 | 80.34 | 74.06 |
| | Full (ITC$_{moD}$ + MLM$_{moD}$ + ITM$_{hard}$) | 97.47 | 92.58 | 80.12 | 80.44 | 74.42 |
| | V + L model (Full + MoD$_{Downstream}$) | 97.83 | 92.65 | 80.30 | 80.50 | 74.54 |
| 14M | V + L model | 98.70 | 94.07 | 80.91 | 83.14 | 75.84 |

In Table 1, the average of R@1, R@5 and R@10 were reported for text-retrieval (TR) and image-retrieval (IR). Also, in Table 1, ITC refers to image-text contrastive learning, MLM refers to masked language modeling, and ITM$_{hard}$ refers to image-text matching with contrastive hard negative mining. MoD: momentum distillation.

Table 2 and Table 3 report results on fine-tuned and zero-shot image-text retrieval, respectively. The V+L model achieves state-of-the-art performance, outperforming other methods which are trained on orders of magnitude larger datasets. Given the considerable amount of improvement of the V+L model when the number of training images increases from 4 M to 14 M, the V+L model can be trained on larger-scale Web image-text pairs.

TABLE 2

Fine-tuned image-text retrieval results on Flickr30K and COCO datasets.

| | | Flickr30K (1 K test set) | | | | | | MSCOCO (5 K) | | | | | |
|---|---|---|---|---|---|---|---|---|---|---|---|---|---|
| | | TR | | | IR | | | TR | | | IR | | |
| Method | # Pretrain Images | R @ 1 | R @ 5 | R @ 10 | R @ 1 | R @ 5 | R @ 10 | R @ 5 | R @ 10 | R @ 1 | R @ 5 | R @ 10 |
| UNITER | 4 M | 87.3 | 98.0 | 99.2 | 75.6 | 94.1 | 96.8 | 88.6 | 93.8 | 52.9 | 79.9 | 88.0 |
| VILLA | 4 M | 87.9 | 97.5 | 98.8 | 76.3 | 94.2 | 96.8 | — | — | — | — | — |
| OSCAR | 4 M | — | — | — | — | — | — | 91.1 | 95.5 | 54.0 | 80.8 | 88.5 |

TABLE 2-continued

Fine-tuned image-text retrieval results on Flickr30K and COCO datasets.

| | | Flickr30K (1 K test set) | | | | | | MSCOCO (5 K) | | | | |
|---|---|---|---|---|---|---|---|---|---|---|---|---|
| | | TR | | | IR | | | TR | | IR | | |
| Method | # Pretrain Images | R @ 1 | R @ 5 | R @ 10 | R @ 1 | R @ 5 | R @ 10 | R @ 5 | R @ 10 | R @ 1 | R @ 5 | R @ 10 |
| ALIGN | 1.2 B | 95.3 | 99.8 | 100.0 | 84.9 | 97.4 | 98.6 | 93.5 | 96.9 | 59.9 | 83.3 | 89.8 |
| V + L | 4 M | 94.3 | 99.4 | 99.8 | 82.8 | 96.7 | 98.4 | 91.4 | 96.0 | 56.8 | 81.5 | 89.2 |
| V + L | 14 M | 95.9 | 99.8 | 100.0 | 85.6 | 97.5 | 98.9 | 94.3 | 97.2 | 60.7 | 84.3 | 90.5 |

TABLE 3

Zero-shot image-text retrieval results on Flickr30K.

| | | Flickr30K (1 K test) | | | | | |
|---|---|---|---|---|---|---|---|
| | | TR | | | IR | | |
| Method | # Pretrain Images | R @ 1 | R @ 5 | R @ 10 | R @ 1 | R @ 5 | R @ 10 |
| ImageBERT | 2 M | 70.7 | 90.2 | 94.0 | 54.3 | 79.6 | 87.5 |
| UNITER | 4 M | 83.6 | 95.7 | 97.7 | 68.7 | 89.2 | 93.9 |
| CLIP | 400 M | 88.0 | 98.7 | 99.4 | 68.7 | 90.6 | 95.2 |
| ALIGN | 1.2 B | 88.6 | 98.7 | 99.7 | 75.7 | 93.8 | 96.8 |
| V + L | 4 M | 90.5 | 98.8 | 99.7 | 76.8 | 93.7 | 96.7 |
| V + L | 14 M | 94.1 | 99.5 | 99.7 | 82.8 | 96.3 | 98.1 |

Table 4 reports the comparison with existing methods on other V+L understanding tasks. With 4 M pretraining images, the V+L model achieved state-of-the-art performance. With 14 M pretraining images, the V+L model substantially outperformed existing methods, including methods that requires additional object tags or adversarial data augmentation. Compared to VILLA, the V+L model achieves absolute improvements of 2.47% on VQA test-std, 3.84% on NLVR$^2$ test-P, and 1.88% on SNLI-VE test. Because the V+L model is detector-free and requires lower resolution images, it also enjoys much faster inference speed compared to existing methods (>10 times faster than UNITER or VILLA).

TABLE 4

Comparison with state-of-the-art methods on downstream vision-language tasks

| Method | VQA | NLVR$^2$ | SNLI-VE | VQA | NLVR$^2$ | SNLI-VE |
|---|---|---|---|---|---|---|
| VisualBERT | 70.80 | 71.00 | 67.40 | 67.00 | — | — |
| VL-BERT | 71.16 | — | — | — | — | — |
| LXMERT | 72.42 | 72.54 | 74.90 | 74.50 | — | — |
| 12-in-1 | 73.15 | — | — | 78.87 | — | 76.95 |
| UNITER | 72.70 | 72.91 | 77.18 | 77.85 | 78.59 | 78.28 |
| VL-BART/T5 | — | 71.3 | — | 73.6 | — | — |
| ViLT | 70.94 | — | 75.24 | 76.21 | — | — |
| OSCAR | 73.16 | 73.44 | 78.07 | 78.36 | — | — |
| VILLA | 73.59 | 73.67 | 78.39 | 79.30 | 79.47 | 79.03 |
| V + L (4 M) | 74.54 | 74.70 | 80.24 | 80.50 | 80.14 | 80.30 |
| V + L (14 M) | 75.84 | 76.04 | 82.55 | 83.14 | 80.80 | 80.91 |

Visual grounding aims to localize the region in an image that corresponds to a specific textual description. The V+L model was shown to achieves visual grounding without being trained on any bounding box annotations, by probing its attention. Experiments were performed on the widely used RefCOCO+ dataset. The pretrained model was fine-tuned on the training set of RefCOCO+, using only image-text supervision. The same fine-tuning strategy was followed for image-text retrieval. Table 5 reports the results.

TABLE 5

Weakly-supervised visual grounding on RefCOCO + dataset.

| Method | Val | TestA | TestB |
|---|---|---|---|
| ARN | 32.78 | 34.35 | 32.13 |
| CCL | 34.29 | 36.91 | 33.56 |
| V + L | 51.58 | 60.09 | 40.19 |

In Table 6, the effect of various design choices was studied on image-text retrieval. Since the contrastive similarity score $s_{itc}$ was used to filter top-k candidates during inference, k can be varied to report its effect. In general, the final ranking result acquired by $s_{itm}$ is not sensitive to changes in k. The reason is that using $s_{itc}$ alone can already achieve good recalls, hence the top-k candidates most likely contain the correct one. It was also validated that the proposed hard negative mining can improve retrieval performance.

TABLE 6

Ablation study on fine-tuned image-text retrieval.

| Site | w/ hard negatives | | | | w/o hard negatives |
| --- | --- | --- | --- | --- | --- |
| | k = 16 | k = 32 | k = 128 | k = 256 | k = 128 |
| TR | 97.30 | 98.60 | 98.57 | 98.57 | 98.57 | 98.22 (−0.35) |
| IR | 90.95 | 93.64 | 93.54 | 93.99 | 93.95 | 93.68 (−0.31) |

In Table 7, the effect of text-assignment (TA) pretraining and parameter sharing was studied on NLVR². Three sharing strategies were examined: (1) the two consecutive mutimodal blocks share all parameters, (2) only the cross-attention (CA) layers are shared, and (3) no sharing. Without TA, sharing the entire block leads to better performance. With TA to pretrain the model for image-pair input, sharing cross-attention layers results in the best performance.

TABLE 7

Ablation study on the effect of text-assignment (TA) pretraining and parameter sharing for NLVR2.

| | w/ TA | | | w/o TA | | |
| --- | --- | --- | --- | --- | --- | --- |
| | share block | share CA | no share | share block | share CA | no share |
| dev | 82.13 | 82.55 | 81.93 | 80.52 | 80.28 | 77.84 |
| test-P | 82.36 | 83.14 | 82.85 | 81.29 | 80.45 | 77.58 |

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

The invention claimed is:

1. A method, performed by one or more processors, for training a vision-and-language learning (V+L) model comprising an image encoder, a text encoder, and a multimodal encoder, the method comprising:
   receiving, via a data interface, a training dataset comprising a plurality of image samples and a plurality of text samples, at least one image sample of the plurality of image samples corresponding to at least one text sample of the plurality of text samples;
   encoding, by an image encoder implemented by the one or more processors, the plurality of image samples into a plurality of encoded image samples and, by a text encoder, the plurality of text samples into a plurality of encoded text samples;
   computing a first loss objective based on the plurality of encoded image samples and the plurality of encoded text samples;
   encoding, by a multimodal encoder implemented by the one or more processors, a first subset of the plurality of encoded image samples and a second subset of the plurality of encoded text samples into a plurality of encoded image-text samples;
   choosing the first subset and the second subset based at least in part on mining negative image-text pairs through contrastive similarity of the encoded image-text samples;
   computing a second loss objective based on the plurality of encoded image-text samples; and
   updating by the one or more processors the V+L model based at least in part on the first loss objective and the second loss objective.

2. The method of claim 1, wherein the first loss objective comprises an image-text contrastive (ITC) loss objective that is an average expected sum of a cross-entropy between computed softmax-normalized image-to-text similarity and labeled ground-truth image-to-text similarity and a cross-entropy between computed softmax-normalized text-to-image similarity and labeled ground-truth text-to-image similarity.

3. The method of claim 1, wherein the second loss objective comprises an image-text matching (ITM) loss objective that is computed as a cross-entropy between a predicted two-class probability of a image-text pair and a ground-truth one-hot two-class possibility, and an MLM loss objective that is computed as a cross-entropy between a predicted possibility of one or more masked tokens in the encoded image-text samples and a ground truth identity of the one or more masked tokens in the encoded image-text samples.

4. The method of claim 1, wherein the updating the V+L model comprises:
   updating the image encoder and the text encoder based at least in part on the first loss objective; and
   updating the multimodal encoder based at least in part on the second loss objective.

5. The method of claim 1, further comprising:
   forming a momentum model using momentum distillation (MoD);
   generating a plurality of modeled image samples and a plurality of modeled text samples using the momentum model;
   including the plurality of modeled image samples in the plurality of image samples; and including the plurality of modeled text samples in the plurality of text samples.

6. The method of claim 1, wherein the image encoder, the text encoder, and the multimodal encoder each comprises a transformer.

7. The method of claim 1, further comprising:
fine-tuning the V+L model for a task selected from the group consisting of: an image-text retrieval task, an image-to-text retrieval (TR) task, a text-to-image retrieval (IR) task, a visual entailment (VE) task, a visual question answering (VQA) task, and a natural language for visual reasoning for real (NLVR) task.

8. A system for training a V+L model, comprising:
a non-transitory memory; and
one or more processor coupled to the non-transitory memory and configured to read instructions from the non-transitory memory to cause the system to perform operations comprising:
receiving, via a data interface, a training dataset comprising a plurality of image samples and a plurality of text samples, at least one image sample of the plurality of image samples corresponding to at least one text sample of the plurality of text samples;
encoding, by an image encoder, the plurality of image samples into a plurality of encoded image samples and, by a text encoder, the plurality of text samples into a plurality of encoded text samples;
computing a first loss objective based on the plurality of encoded image samples and the plurality of encoded text samples;
encoding, by a multimodal encoder, a first subset of the plurality of encoded image samples and a second subset of the plurality of encoded text samples into a plurality of encoded image-text samples;
choosing the first subset and the second subset based at least in part on mining negative image-text pairs through contrastive similarity of the encoded image-text samples;
computing a second loss objective based on the plurality of encoded image-text samples; and
updating the V+L model of the image encoder, the text encoder, and the multimodal encoder based at least in part on the first loss objective and the second loss objective.

9. The system of claim 8, wherein the updating the V+L model comprises updating the image encoder and the text encoder based at least in part on the first loss objective and updating the multimodal encoder based at least in part on the second loss objective.

10. The system of claim 8, wherein the operations further comprise:
forming a momentum model using momentum distillation (MoD);
generating a plurality of modeled image samples and a plurality of modeled text samples using the momentum model;
including the plurality of modeled image samples in the plurality of image samples; and
including the plurality of modeled text samples in the plurality of text samples.

11. The system of claim 8, wherein the image encoder, the text encoder, and the multimodal encoder each comprise a transformer.

12. The system of claim 8, wherein the operations further comprise fine-tuning the V+L model for a task selected from the group consisting of: an image-text retrieval task, an image-to-text retrieval (TR) task, a text-to-image retrieval (IR) task, a visual entailment (VE) task, a visual question answering (VQA) task, and a natural language for visual reasoning for real (NLVR) task.

13. A non-transitory, machine-readable medium having stored thereon machine-readable instructions executable to cause a system to perform operations comprising:
receiving, via a data interface, a training dataset comprising a plurality of image samples and a plurality of text samples, at least one image sample of the plurality of image samples corresponding to at least one text sample of the plurality of text samples;
encoding, by an image encoder, the plurality of image samples into a plurality of encoded image samples and, by a text encoder, the plurality of text samples into a plurality of encoded text samples;
computing a first loss objective based on the plurality of encoded image samples and the plurality of encoded text samples;
encoding, by a multimodal encoder, a first subset of the plurality of encoded image samples and a second subset of the plurality of encoded text samples into a plurality of encoded image-text samples;
choosing the first subset and the second subset based at least in part on mining negative image-text pairs through contrastive similarity of the encoded image-text samples;
computing a second loss objective based on the plurality of encoded image-text samples; and
updating the image encoder, the text encoder, and the multimodal encoder based at least in part on the first loss objective and the second loss objective.

14. The non-transitory, machine-readable medium of claim 13, wherein the updating the V+L model comprises updating the image encoder and the text encoder based at least in part on the first loss objective and updating the multimodal encoder based at least in part on the second loss objective.

15. The non-transitory, machine-readable medium of claim 13, wherein the operations further comprise:
forming a momentum model using momentum distillation (MoD);
generating a plurality of modeled image samples and a plurality of modeled text samples using the momentum model;
including the plurality of modeled image samples in the plurality of image samples; and
including the plurality of modeled text samples in the plurality of text samples.

16. The non-transitory, machine-readable medium of claim 13, wherein the image encoder, the text encoder, and the multimodal encoder each comprise a transformer.

17. The non-transitory, machine-readable medium of claim 13, wherein the operations further comprise fine-tuning the V+L model for a task selected from the group consisting of: an image-text retrieval task, an image-to-text retrieval (TR) task, a text-to-image retrieval (IR) task, a visual entailment (VE) task, a visual question answering (VQA) task, and a natural language for visual reasoning for real (NLVR) task.

* * * * *